United States Patent [19]

Browning

[11] Patent Number: 4,509,637

[45] Date of Patent: Apr. 9, 1985

[54] BOLT TOGETHER CONVEYOR STRUCTURE

[76] Inventor: Jess Browning, 4217 Via Pinzon, Palos Verdes Estates, Calif. 90274

[21] Appl. No.: 536,688

[22] Filed: Sep. 28, 1983

Related U.S. Application Data

[63] Continuation of Ser. No. 266,926, May 26, 1981, abandoned.

[51] Int. Cl.³ .............................................. B65G 37/00
[52] U.S. Cl. ..................................... 198/472; 198/862
[58] Field of Search ............. 198/472, 648, 862, 861, 198/860, 735, 721; 104/172 BT, 172 B

[56] References Cited

U.S. PATENT DOCUMENTS

| | | | |
|---|---|---|---|
| 2,317,675 | 4/1943 | De Burgh | 104/172 B |
| 2,619,916 | 12/1952 | Rainier | 104/172 B |
| 2,640,580 | 6/1953 | De Burgh | 104/172 B |
| 2,820,420 | 1/1958 | Hayes | 104/196 |
| 3,292,772 | 12/1966 | Rice | 198/816 |
| 3,410,225 | 11/1968 | Saunders, Jr. | 104/172 B |
| 3,726,234 | 4/1973 | Dema et al. | 104/172 S |
| 3,848,732 | 11/1974 | Catalano | 198/861 |
| 3,912,072 | 10/1975 | Kornylak | 104/172 B |

*Primary Examiner*—Joseph E. Valenza
*Assistant Examiner*—Kyle E. Shane
*Attorney, Agent, or Firm*—Blakely, Sokoloff, Taylor & Zafman

[57] ABSTRACT

A chain powered conveyor system comprised of standardized modular sections which can be selected and mixed in the proper combination and set in place and bolted together. The modular sections result in a structure which allows easy relocation, along the length of the conveyor path, of the point or points at which a work pallet may be disengaged from the drive chain. The modular construction also allows for ready disassembly, redesign of the path of the conveyor, and reassembly in the configuration of the new path.

6 Claims, 11 Drawing Figures

BOLT TOGETHER CONVEYOR STRUCTURE

This is a continuation of application Ser. No. 266,926 filed May 26, 1981 now abandoned.

SUMMARY

A chain powered conveyor system is provided which is comprised of standardized modular sections which can be selected and mixed in the proper combination and assembled in place merely by bolting the sections together. No welding is required to assemble the conveyor system. The modular sections result in a structure which allows easy relocation, along the length of the conveyor path, of the point or points at which a work pallet may be disengaged from the drive chain. The modular construction also allows for ready disassembly, redesign of the path of the conveyor, and reassembly in the configuration of the new path.

DESCRIPTION OF THE DRAWINGS

FIG. 4b is a cross section taken along the line 4b—4b of the curve section shown in FIG. 4a.

DETAILED DESCRIPTION

Figure 1:
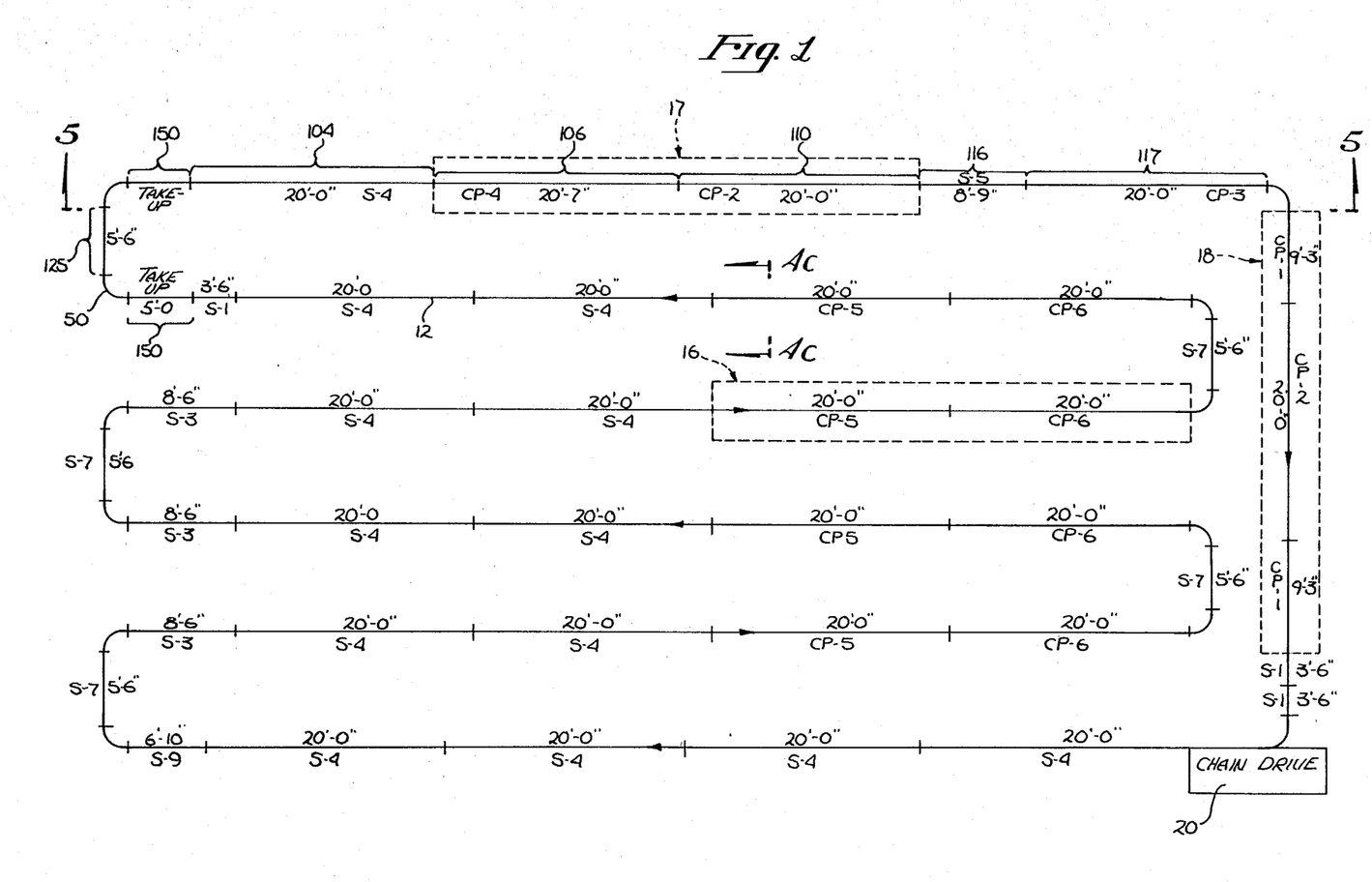
FIG. 1 shows a typical conveyor path for conveying work pieces along a work processing path.
Figure 2:
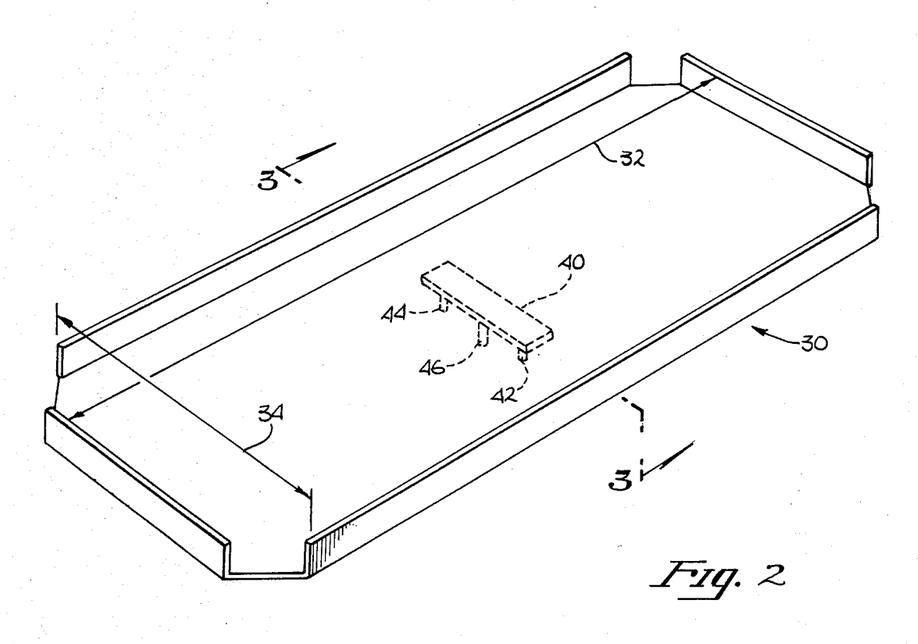
FIG. 2 is a perspective view of a pallet for holding work pieces as they travel along the conveyor.
Figure 3:
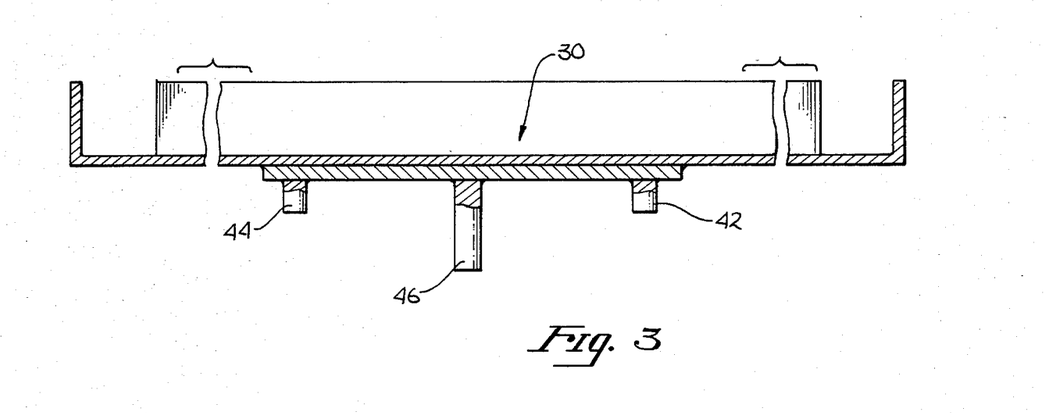
FIG. 3 is a cross section of a pallet taken along the line 3—3 of FIG. 2.

Conveyor systems are commonly used to transport work pieces from one location to another within a factory. A conveyor system may follow any path desired to bring the work pieces to a particular processing station, and a particular switchback path is shown in FIG. 1. The conveyor system 10 may be a chain driven system drivn by a motor and sprocket wheel chain drive means 20. The work piece may be placed on a pallet coupled to the chain for travel along the conveyor path 12. One such pallet 30 is shown in FIGS. 2 and 3. The pallet 30 has a depending drive pin 46 for driving engagement with a trolley 50 driven by the chain 15. The pallet 30 and work piece are thus driven around the path of conveyor system 10.

The pallet 30 and work piece will thus follow the path 12 from one work station such as station 16 to others such as stations 17 and 18. Work station 16 might be a paint spray booth, or a polishing booth, or whatever other kind of processing station is required for the particular work piece. Generally, whenever work is being done to a work piece, in order to improve the efficiency of the work the pallet must be free to pivot for access to all sides of the work piece. If the work piece is to be heated, such as for drying, or if the work piece is to be processed in any way that requires any extended time at a particular work station, (1) the speed of the work piece must be reduced and (2) the work pieces are packed more closely to one another along the conveyor. In order to more closely pack pallets 30, which normally travel along path 12 with their longer dimension 32 parallel with the path 12, it is common practice to rotate the pallet 30 about 90 degrees so that the shorter dimension 34 of the pallet is parallel to the path. This is typically accomplished by providing appropriately positioned cams to engage guide pins 42 and 44 or to engage an edge of pallet 30 and rotate the pallet. The rotation is typically done just before entering, and upon leaving, a work station.

Ideally, once assembled, the path of the conveyor and the location of work stations would not change. However, improvements in technology, increased costs, efficiency considerations and various other factors often persuade management to reposition the path of the conveyor and/or the location of work stations along the path. Hence it is desirable that a conveyor system be readily assembled and disassembled and be adaptable to accommodate a change in work station locations. It is with these objectives in mind that I have devised the present conveyor system.

My system employs a finite set of standardized interchangeable modular conveyor sections. These modules are specifically designed to be bolted together to define the path 12. Thus, the conveyor system 10 is readily dis-assembled for transport or for redesigning the shape or location of path 12. Because the modules are bolted together, no welding is required to assemble the system. This is especially advantageous in areas where welders are not plentiful.

In order to accommodate relocation of work stations, which generally require a reduction in speed of the work piece, I have devised a unique chain guiding channel the geometry of which effects disengagement of the pallet from the drive chain. The pallets are thereafter not driven by the chain, but by contact with the pallet behind. At any given work station the pallets have been rotated such that their length is perpendicular to the path 12 (i.e., the pallets are close packed). They are driven when the pallet behind bumps against the pallet ahead. Because they are close packed, their efective speed is reduced. Those chain guiding channel sections which disengage the pallet from the chain, I have called "close packed" sections or CP sections. These CP sections have been designed with a length and other dimensions which permit them to be interchanged with the conventional straight sections where the pallet is engaged with the chain. Thus, to change the location of a work station, a section of straight chain guide channel (an S section) is removed and a "close packed" section (a CP section) is bolted in its place. The straight section may be placed in the former position of the CP section. The work station portion of the conveyor system has thus been relocated with minimum inconvenience. The various standardized modular sections (and cross sections) are shown in FIGS. 4a through 7.

Figure 4A:
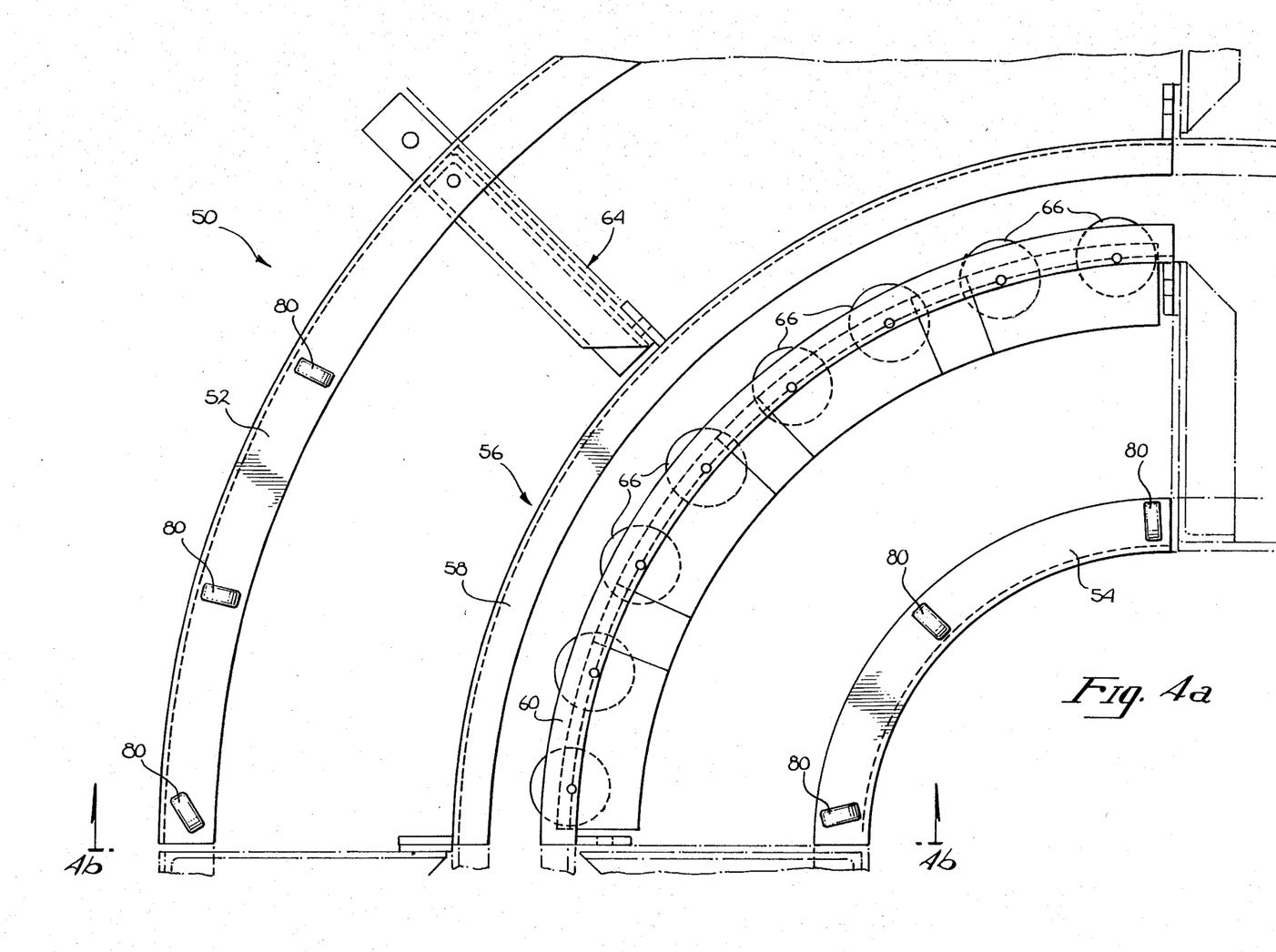
FIG. 4a is a detail plan view of a curve in the path of the conveyor of FIG. 1.

A standardized one-quarter circular section, for forming the curves or corners of the path 12 is shown in FIG. 4a.

Figure 4B:
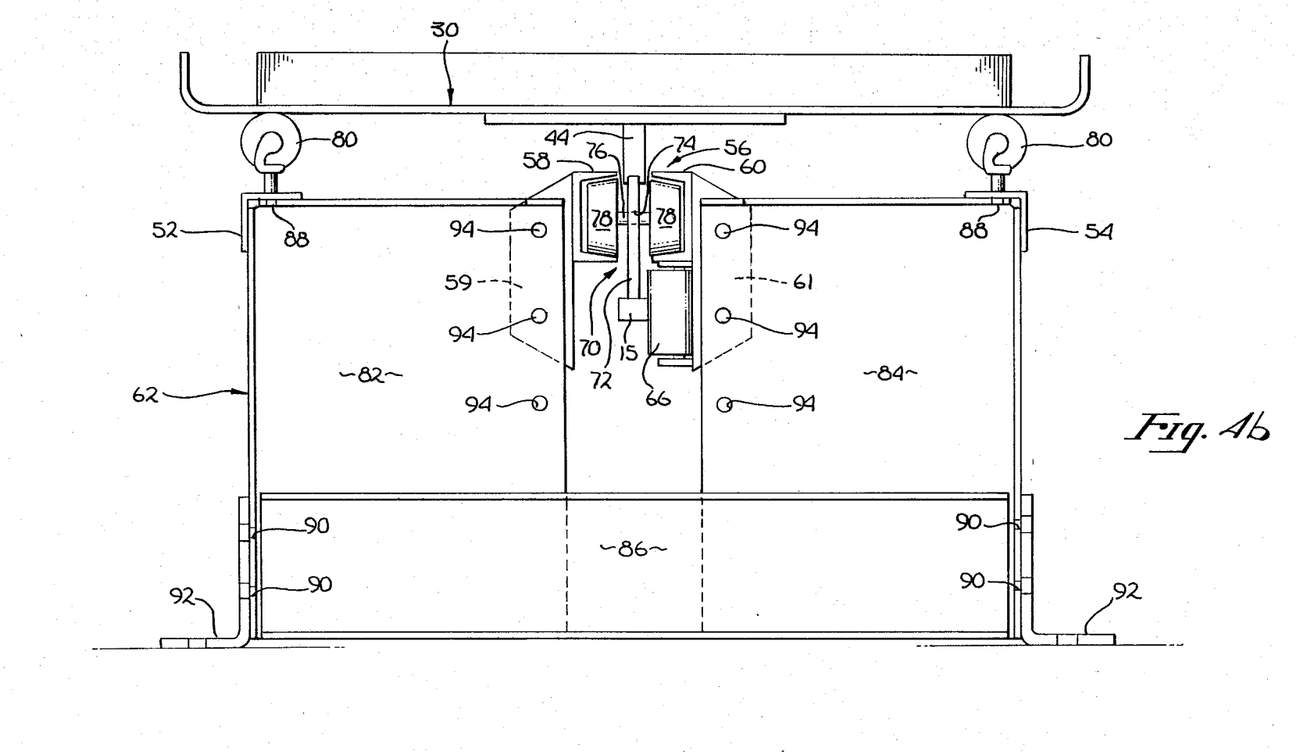

The corner section 50 comprises a radially outer caster rail 52 with an outer radius of curvature of about 37 inches and a radially inner caster rail 54 with an inner radius of curvature of about 11 inches. A centrally located trolley guide channel 56 is formed of two C shaped channels 58 and 60 with the open side of the C's facing one another and spaced apart slightly. The rails 52 and 54 and the trolley guide channel 56 are mounted to and supported above the floor by spaced apart support stands 62 which are secured in place to the floor. One such support stand is placed at each end of the one-quarter circular section 50, and a partial support stand 64 supports the outer caster rail 52 of section 50 at the midpoint of its arc. To assist the chain 15 to negotiate the turn of corner section 50, a series of rollers 66 are secured beneath the radially inner C shaped channel 60. When making the turn, the chain 15 rides on the rollers 66 and does not contact the C shaped channel. The details of connection between the pallet 30 and the chain 15 as they negotiate the corner section 50 are best illustrated in FIG. 4b. The support stand 62 is also shown therein and in greater detail in FIG. 4d.

At two foot intervals, the chain 15 is secured to a trolley 70, riding within trolley guide channel 56, by a trolley arm 72. The lower end of trolley arm 72 is welded to chain 15. The upper end of trolley arm 72 is provided with a hole 74 to allow the axle 76 of the trolleywheels 78 to pass through the trolley arm. If the trolley arm 72 extends a sufficient distance above the axle of the trolley wheels 78, it will contact the depending drive pin 46 of a pallet 30. Thus, if power is applied to drive the chain 15, the trolley arm 72 will be driven up against the drive pin 46 and transfer the drive power to the pallet 30 thereby moving it along the conveyor path 12. If the trolley arm 72 is not long enough to reach the drive pin 46 it is referred to as an idler arm and is used only to maintain the chain 15 in a relatively uniform horizontal plane.

The C-shaped channels 58 and 60 are integrally formed with flanges 59 and 61 respectively to permit bolting the C-shaped sections to the support stands 62. Each flange is provided with holes spaced to match holes provided in the support stand 62. Likewise the caster rails 52 and 54 are provided with holes to match holes provided in the support stand, thus permitting the rails to be bolted to the support stands. As the pallet 30 is driven along the path 12, it rides upon casters 80 provided in spaced apart relation along caster rails 52 and 54.

Figure 4C:
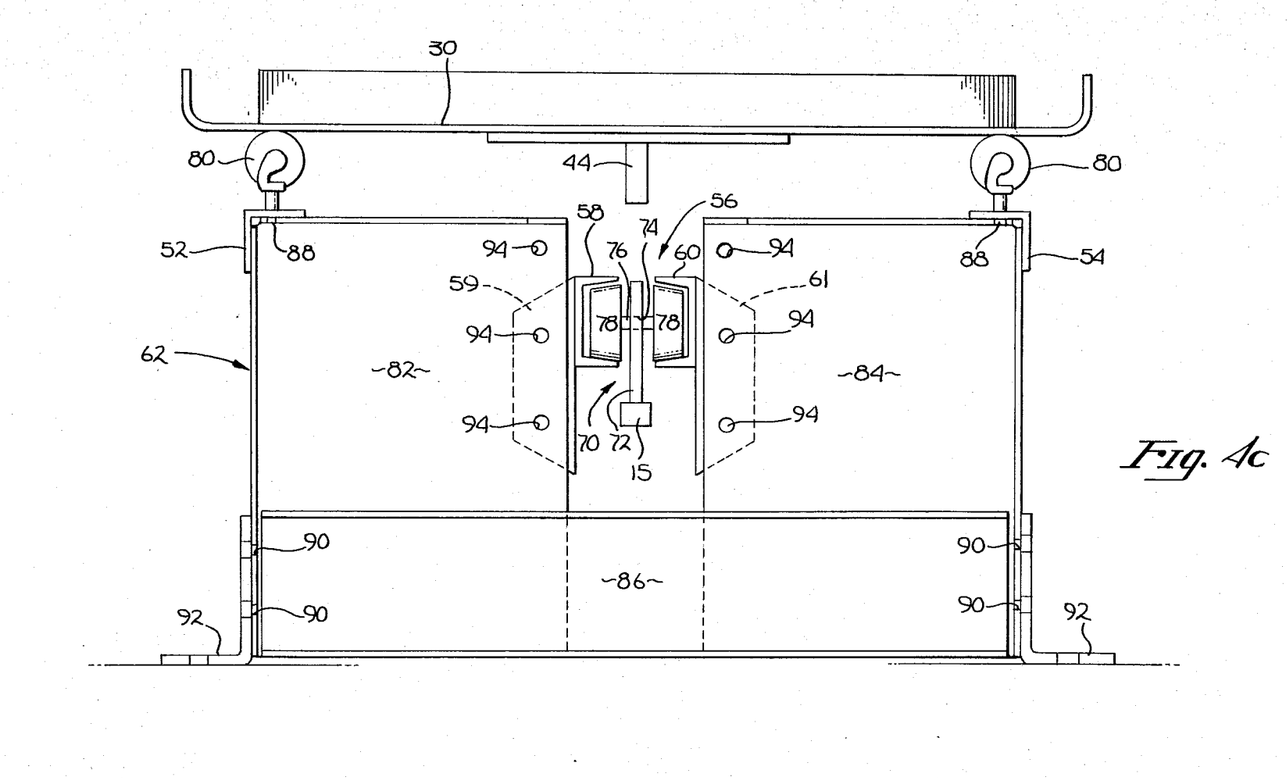
FIG. 4c is a cross section taken at a point in the conveyor path where the chain is in the lowered position, such as at 4c—4c of FIG. 1.
Figure 4D:
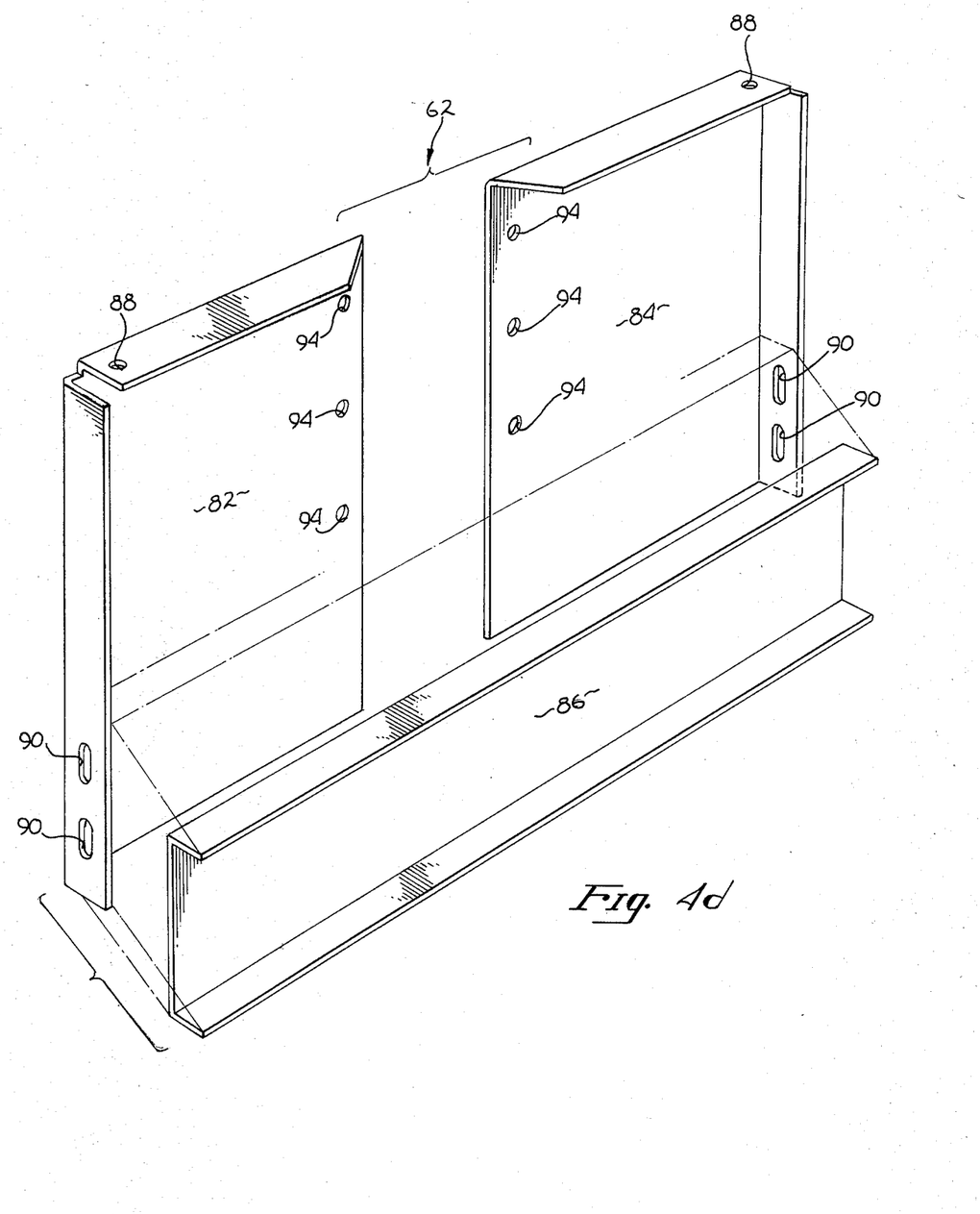
FIG. 4d is a perspective view of the three segments of a support panel.

The support stand 62 is shown most clearly in FIG. 4d. The support stand 62 comprises a left panel 82, a right panel 84 and a base panel 86. Each such panel is constructed of sheet metal cut and shaped as shown. The holes 88 are for bolting the caster rails 52 and 54 onto the support stand. The holes 90 are for bolting the panels 82 and 84 to the floor brackets 92. The three holes 94 in each panel 82 and 84 permit the C-shaped channels 58 and 60 and their associated flanges 59 and 61 to be mounted upon the panels 82 and 84 in an upper position as shown in FIG. 4b or in a lower position as shown in FIG. 4c. The difference in elevation between the two positions is approximately 3 inches.

Figure 5:
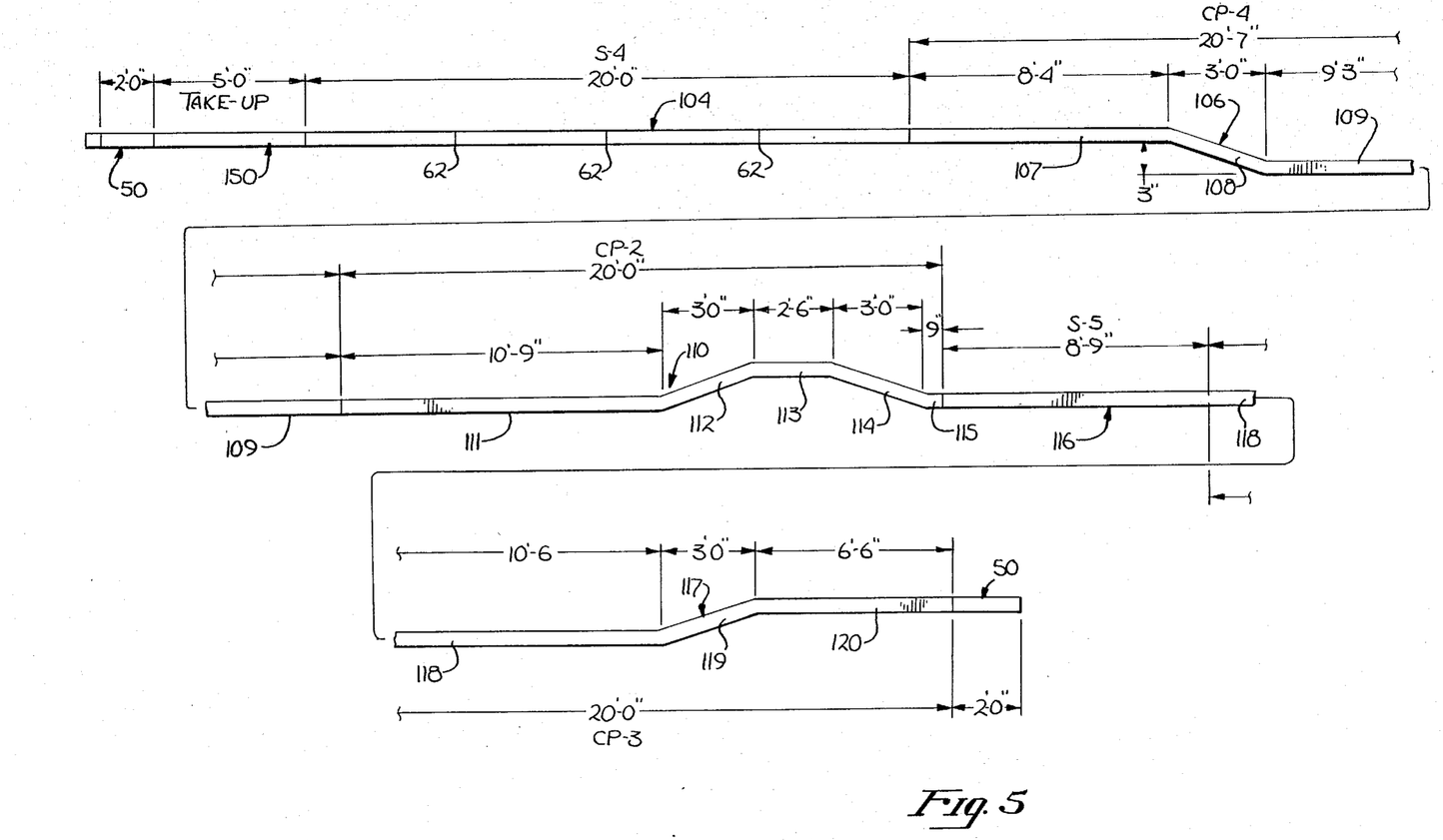
FIG. 5 is an elevational view, of a portion of the conveyor path, looking in the direction of 5—5 of FIG. 1.
Figure 6:
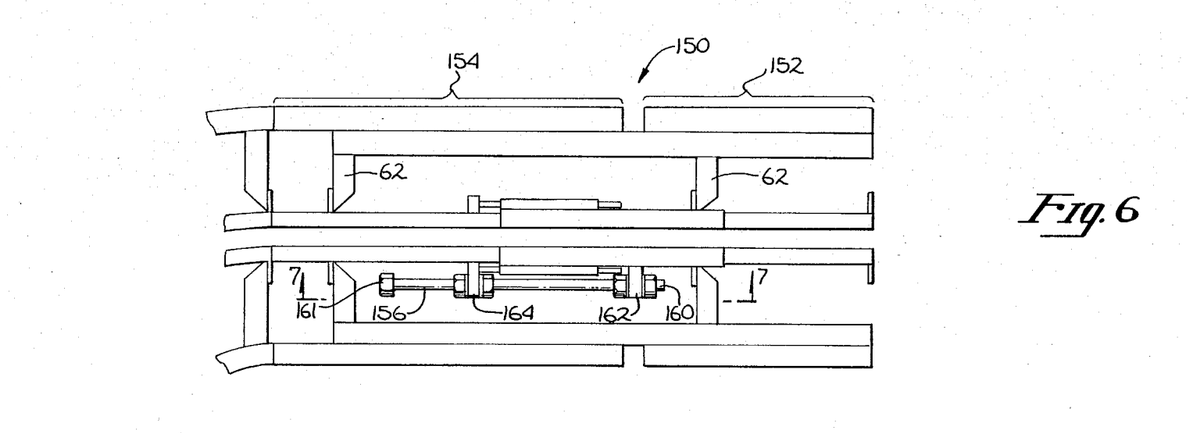
FIG. 6 is a detail plan view of the chain take-up section of the conveyor system.

FIG. 5 shows an elevational view of a portion of path 12 as indicated by the perspective line 5—5 of FIG. 1. Only the trolley guide channel 56 is shown. The caster rails, which do not change in elevation, are not shown. The illustrated portion of path 12 comprises a number of bolted together standard modules. Section 50 is a one-quarter circular corner section as discussed above and shown in FIGS. 4a and 4b. Section 150 is a "take-up" section illustrated in detail in FIGS. 6 and 7. Section 104 is a standard straight section (S-4). Section 106 is one form of a standard "close packed" section designated CP-4. It comprises a first section 107 of standard height, 8 feet 4 inches in length, a second section 108 which gradually slopes downward, and is 3 feet in length, and a third section 109 which is 9 feet 3 inches in length and is three inches lower in elevation than the first section 107. Section 110 is a second standard "close packed" section (CP-2). It comprises a first section 111, lowered three inches in elevation to meet the elevation of section 109, and is about 10 feet 9 inches in length. It also has an upward sloping portion 112 which is 3 feet in length, a short straight section 113 of 2 feet 6 inches in length, a downward sloping section 114 of 3 feet in length and a short 9 inch straight section 115, which is three inches lower than section 113. Section 116 (S-5) is a standard straight section 8 feet 9 inches in length. Section 117 is a third standard "close packed" section (CP-3) having a straight section 118 of 10 feet 6 inches, an upward sloping section 119 of 3 feet in length and a straight section 120 of 6 feet 6 inches in length. The final section 50 shown in FIG. 5 is again a standard one-quarter circular section. When these sections are bolted end to end and bolted in place on spaced apart support stands 62, they define a portion of path 12 having two sections (A-B and C-D) of lowered trolley guide channel elevation.

As can be readily visualized with the aid of FIGS. 4b, 4c and 5, when the trolley 70 passes through a portion of trolley guide channel 56 which is lowered (i.e., A-B or C-D in FIG. 5) the trolley arm 72 is too low to contact drive pin 46 of a pallet 30. Thus a given pallet 30 is only moved along path 12 when pushed by a following pallet 30. But since the pallets have been rotated to the "close packed" position their velocity along the path is greatly reduced. The simple device of lowering the trolley guide channel 56 thus disengages the trolley arm 72 from the drive pin 46 and achieves the second objective of my system, i.e., reduced speed of the work piece at a work station. Since the "closed packed" (CP type) trolley guide channel is of modular and bolt-on construction, it is easy to understand how a work station (i.e., CP type section of trolley guide channel 56) are readily moved from one location in the path 12 to another.

The following Table I itemizes the various standardized modules of "straight" trolley channel and "close packed" trolley channel that are presently considered adequate to construct a wide variety of paths 12. The take-up section 150 is discussed separately below.

TABLE I

| Section Type | Length overall |
| --- | --- |
| CP-1 | 9' - 3" |
| CP-2 | 20' - 0" |
| CP-3 | 20' - 0" |
| CP-4 | 20' - 7" |
| CP-5 | 20' - 0" |
| CP-6 | 20' - 0" |
| S-1 | 3' - 6" |
| S-2 | 4' - 3" |
| S-3 | 8' - 6" |
| S-4 | 20' - 0" |
| S-5 | 8' - 9" |
| S-6 | 14' - 4" |
| S-7 | 5' - 6" |
| S-8 | 21' - 10" |

TABLE I-continued

| Section Type | Length overall |
| --- | --- |
| S-9 | 6' - 10" |

To use such a modular system to greatest advantage and maintain greatest flexibility, all long straight conveyor path sections should contain as many as possible of the 20 foot S-4 sections since this is the precise length of four of the CP sections. The sections of such a system would be highly interchangeable, thus permitting greatest freedom in locating and relocating work stations.

As with any system employing a chain drive of appreciable length, some method must be provided for adjusting the tension on the chain. In the present modular bolt together conveyor system this adjustment is effected by the "take-up" module 150 shown in detail in FIGS. 6 and 7. The "take-up" module has a stationary portion 152 and a moveable portion 154 whose motion and position are determined by adjustment of screw 156. When a pair of such "take-up" sections 150 are placed one at each side of a bend in the path 12, such as comprised of the two one-quarter circular sections and the intermediate straight section (S-7) shown in FIG. 8, advancement of screws 156 will push moveable portions 154, the two one-quarter circular sections 50 (whose support stands are *not* anchored to the floor) and will push straight section 125 (S-7) (whose support stands are free to slide along tracks 158 shown in FIG. 8) away from the stationary section 152, thus lengthening the path 12 and increasing the tension on chain 15. Conversely, retraction of screws 156 will move those sections toward the stationary section 152 and loosen the chain 15.

Figure 7:
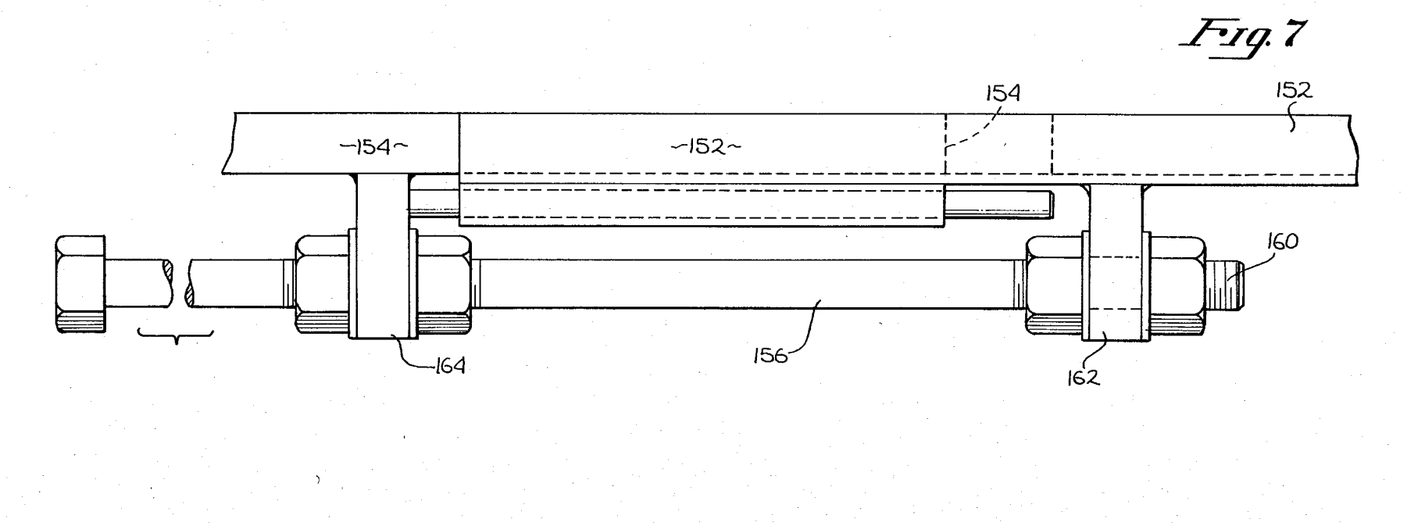
FIG. 7 is a side elevation view of the take-up mechanism taken in the direction of 7—7 of FIG. 6.
Figure 8:
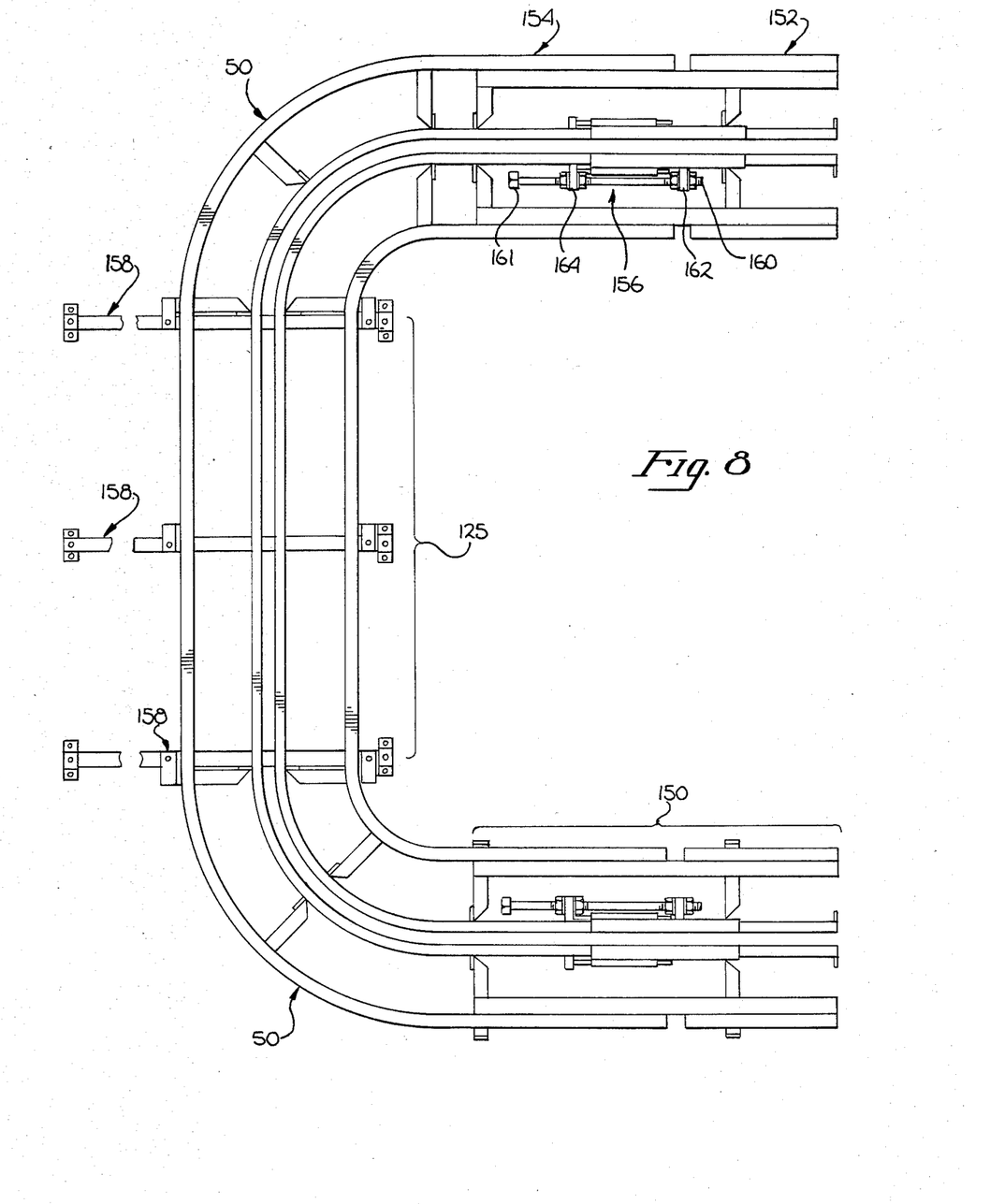
FIG. 8 is a plan view of that portion of the conveyor path which is positionally adjusted by the take-up mechanism, to tension the chain.

The details of the construction of the adjusting mechanism are shown in FIG. 7. One end 160 of screw 156 is mounted for free and loose (not threaded) rotation within bracket 162 which is welded to the stationary portion 152. The intermediate portion of screw 156 is mounted for threaded rotation within bracket 164 which is welded to moveable portion 154. Advancement of screw 156 thus tends to force bracket 164 toward the other end 161 of screw 156 further separating the moveable portion 154 from the stationary portion and forcing the straight section S-7 and two one-quarter circular sections 50 toward the left as viewed in FIG. 8 thereby lengthening the path 12 and tightening the tension on chain 15.

There has thus been provided a conveyor system of modular, bolt-together construction having a simple method for reducing the speed of the work piece as it passes through a work section. Because of its interchangeable modular construction work stations may be relocated along the conveyor path with minimal modifications required to the conveyor to accommodate the relocation.

While the invention has been described and illustrated with particular reference to FIGS. 1 through 8, the description and Figures are for illustration only and are not to be interpreted as limiting the scope of my invention. Many changes in material, construction and arrangement of parts may be made by one of ordinary skill in the art without departing from the spirit and scope of the invention as defined in the appended claims.

What is claimed is:

1. A conveyor assembly for supporting a plurality of pallets, each pallet having a drive pin extending below the bottom surface thereof, comprising:
   (a) a plurality of interchangeable modular conveyor sections which are affixed together to define a conveyor pathway, each of said sections comprising:
   a plurality of standardized generally flat, U-shaped support stands which may be compactly stacked for shipment, each of said support stands being adapted for anchoring to a floor with adjustable elevation and provided with appropriately located first bolt holes adjacent the U-shaped opening in said support stands, and second bolt holes adjacent the outer portion of the upward extending legs of said U-shaped support stands;
   a plurality of individual standardized trolley rails, each of said trolley rails having a channel section having at least one trolley rail mounting member permanently fastened thereto and provided with a plurality of spaced apart third bolt holes, said trolley rail mounting members of each of said trolley rails being bolted in said first bolt holes on one of the two opposite sides of the U-shaped opening of said support stands so that two channel sections are spaced apart facingly disposed parallel relationship and generally perpendicular to said support stands to define a conveyor path whereby a pallet drive pin may extend between and be guided by said channel sections;
   (b) a flexible drive means, and a plurality of pairs of trolley wheels coupled within and guided by said facingly disposed channel sections, said trolley wheels being fastened to said flexible drive means at spaced apart positions so as to support said flexible drive means;
   (c) pallet support means adjacent each side of said trolley rails for supporting a pallet on the conveyor assembly;
   (d) a plurality of pallet engagement means coupled to said drive means for engaging said drive pins;
   whereby said plurality of interchangeable modular conveyor sections may be readily assembled to define a desired conveyor pathway and may be readily disassembled, including disassembly of each of said individual trolley rails from said support stands for dense packing for transport or for redesigning the shape or location of the conveyor pathway, and a disassembled on site without requiring welding or other skilled labor for erection, alignment, leveling and adjustment.

2. The assembly of claim 1 wherein said pallet support means comprise a rail coupled to said support stands and having a plurality of casters on the upper surface thereof.

3. The assembly of claim 2 wherein said flexible drive means is suspended from and below said trolley wheels.

4. The assembly of claim 3 further comprised of standardized corner sections, each having a pair of spaced apart curved trolley rails supported on said support stands, the trolley rail at the inside of the curve having therebelow a cooperatively curved guide means for guiding said flexible drive member around the curve while maintaining approximately the same radius of curvature in said flexible drive member.

5. The conveyor assembly of claim 4 wherein said support stands are adapted for anchoring to a floor by anchor members fastenable directly to a floor, said support stands being bolted to said anchor members through vertically slotted holes, whereby the elevation and level of said support stands may be adjusted after said anchor members are anchored to a floor.

6. The conveyor assembly of claim 1 wherein said trolley rail mounting members may be bolted to each of said support stands at an upper and a lower elevation with respect thereto, said pallet engagement means engaging said drive pins at locations where said rail mounting members are bolted to said support stands at the upper elevation, said pallet engagement means passing below said drive pins at locations where said rail mounting members are bolted to said support stands at the lower elevation.

* * * * *